UNITED STATES PATENT OFFICE.

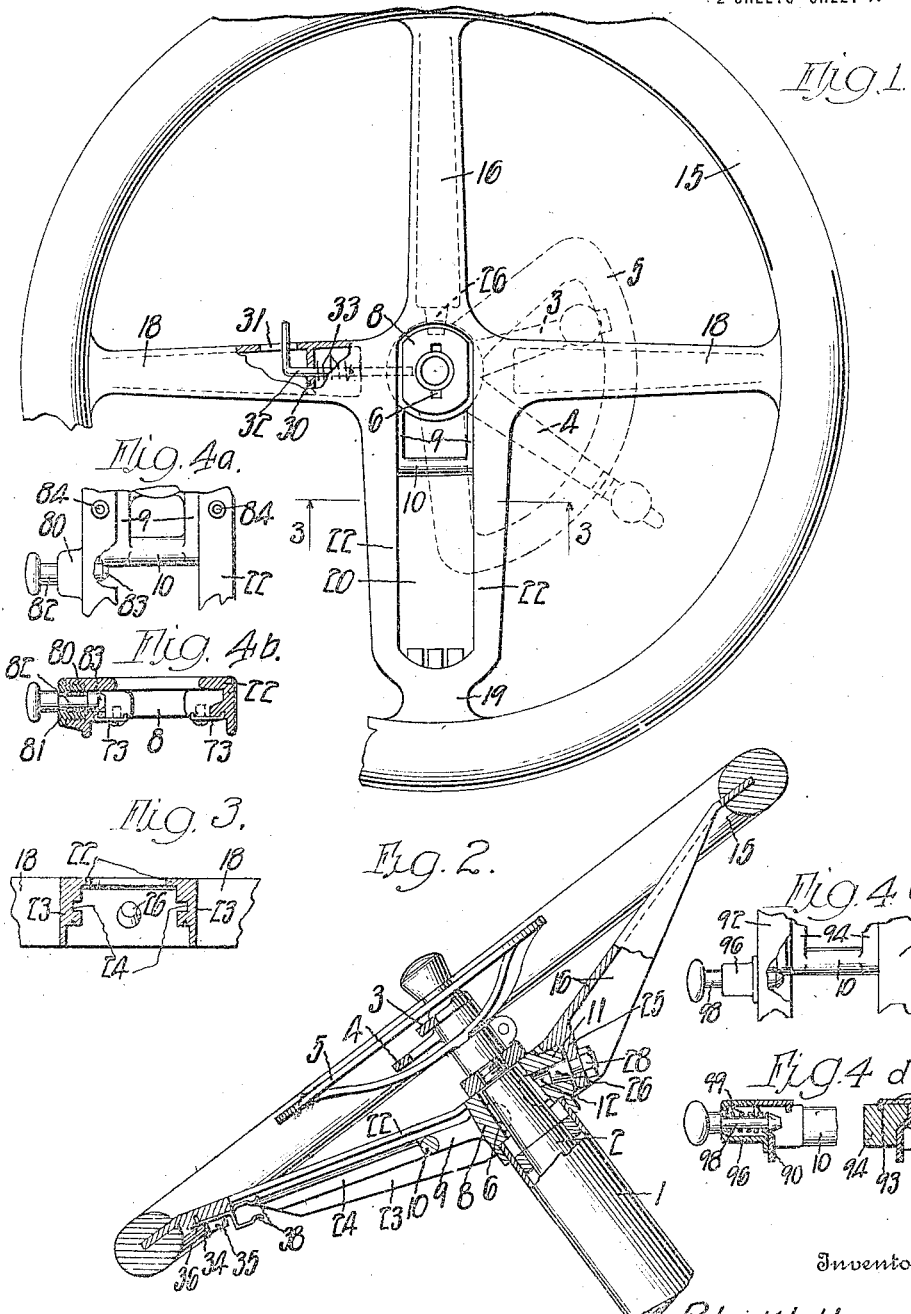

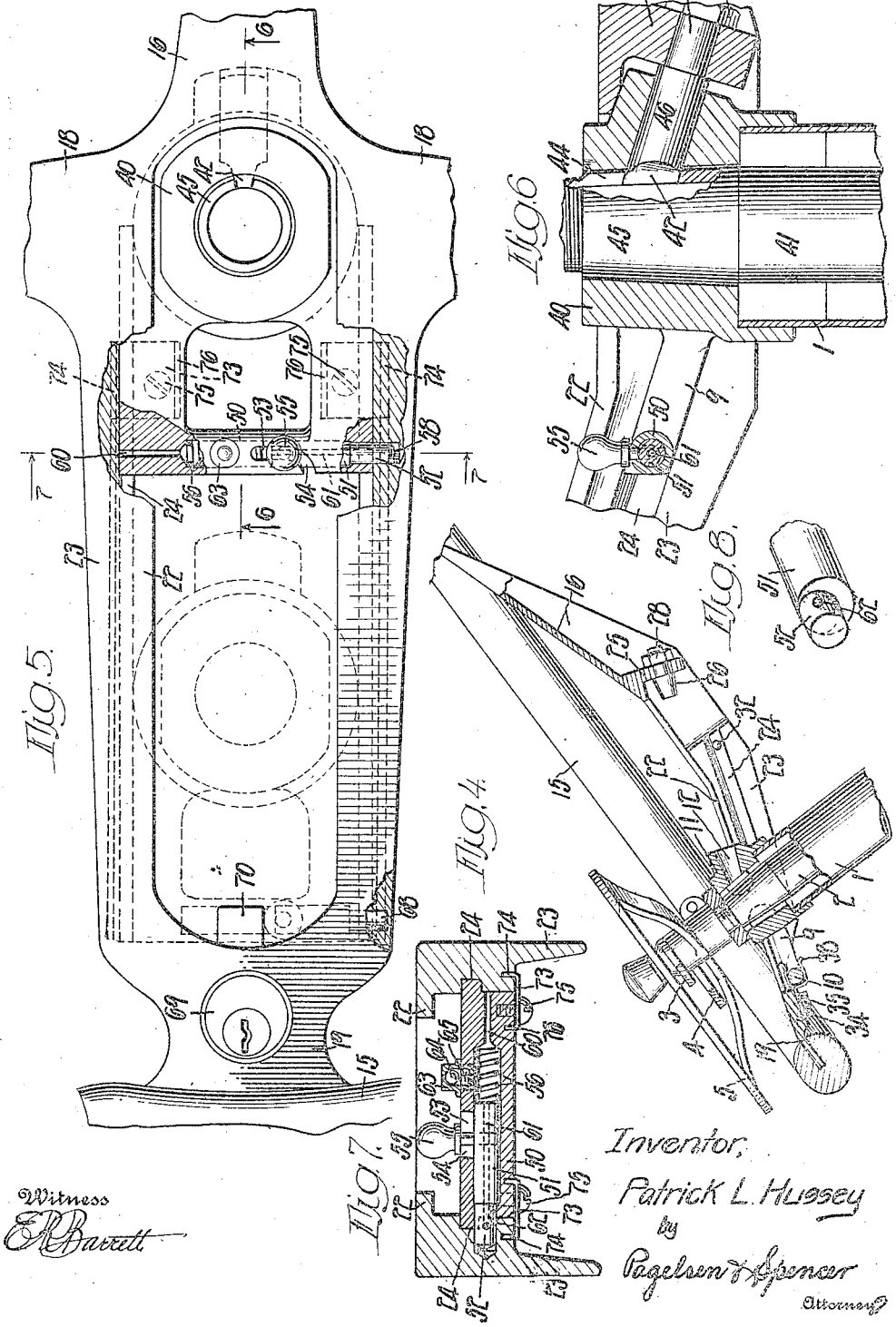

PATRICK L. HUSSEY, OF CLEVELAND, OHIO.

SHIFTABLE STEERING-WHEEL.

1,259,100.

Specification of Letters Patent. Patented Mar. 12, 1918.

Application filed June 29, 1916. Serial No. 106,567.

*To all whom it may concern:*

Be it known that I, PATRICK L. HUSSEY, a citizen of the United States, and residing at Cleveland, in the county of Cuyahoga and State of Ohio, have invented a new and Improved Shiftable Steering-Wheel, of which the following is a specification.

It is customary to provide coöperating guides on the heads of steering posts for motor vehicles and on the spiders of the steering wheels whereby the wheel may be shifted bodily transversely in respect to the post to afford clearance for the driver in getting into or leaving the seat. These constructions, however, have been weak, loose and difficult to manufacture for the reason that the turning force has been transmitted to the head through the medium of the guides.

One object of the present invention is to overcome the objections set forth, and, to accomplish this end, it consists, in combination with the head and guides, in means whereby the turning force is, at least for the most part, transmitted into the steering rod independently of the bearing surfaces of the guides when the wheel is in steering position. It also consists, in combination with the steering rod and a member free to rotate thereon when the wheel is not in steering position, in means whereby said wheel, member and steering rod are automatically coupled together against relative rotary movement when the wheel is in steering position; also in means for locking the wheel in non-steering position to prevent the car from being stolen; also in improved means whereby the wheel is latched in steering position, and in means for lubricating the bearing surfaces. The invention further consists in the details of construction shown, described and claimed.

In the drawings, Figure 1 is a plan view showing one embodiment of the invention. Fig. 2 is a side view, parts being broken away. Fig. 3 is a section through the central spoke and looking forwardly from a point ahead of the post. Fig. 4 is a section corresponding to Fig. 2, the wheel being in forward or non-steering position. Fig. 4ª is a fragmentary plan view showing a modification. Fig. 4ᵇ is a transverse section thereof. Figs. 4ᶜ and 4ᵈ are views similar to Figs. 4ª and 4ᵇ showing a further modification. Fig. 5 is a fragmentary plan view, parts being broken away, showing a modification. Fig. 6 is a section on line 6—6 of Fig. 5. Fig. 7 is a section on line 7—7 of Fig. 6. Fig. 8 is a fragmentary perspective view showing the ends of the latch bolt.

Like reference characters refer to like parts.

The steering post 1 incloses the hollow steering rod 2 through which engine controlling rods (not shown, provided with control levers 3 and 4 that sweep over the arc 5) pass in the usual way. It is obvious, however, that the steering rod may be solid.

Rigidly secured to the upper end of the steering rod by keys 6 or otherwise is a head 8, upon the opposite sides of which are formed guides 9 that are preferably inclined forwardly and downwardly (when the front wheels are in neutral position); these guides extend backwardly somewhat from the body portion of the head and have their rear ends joined and braced by the cross piece 10. It will be understood, however, that the guides may extend perpendicular to the post or may be inclined in the opposite direction from that shown, that is, forwardly and upwardly. Upon its forward side, the head has a boss 11 in which is formed a rearwardly tapering socket 12, the axis of which is parallel to the plane of the guides.

The steering wheel includes the usual rim 15 and an integrally formed spider that preferably comprises the front or longitudinal spoke 16 and the side or lateral spokes 18, each formed of an outwardly tapering, downwardly opening channel section. These spokes merge into the relatively wider rearwardly extending spoke 19 in which is formed an open slot 20 that extends from a point just forward of the rim to a point a short distance ahead of the center of the rim. Each of the divisions of the spoke 19 comprises a narrow in-turned upper flange 22 from which the aprons 23, having longitudinal grooves 24 for the reception of the guides 9, extend downwardly in parallel relation to each other. It will be seen that the grooves are concealed by the aprons. Formed at the rear end of the spoke 16 is a perforated cross wall 25 from which a tapered torque pin 26, held in place by a nut 28, projects rearwardly in position to be received in the socket 12.

One of the spokes 18 is preferably provided with a perforated lug or cross wall 30 (Fig. 1), and is slotted at 31 to receive the latch rod 32 of suitable construction, which, when the wheel is in steering position, is thrust by the spring 33 into a socket in the side of the head. When in the other extreme position, the wheel is retained by a spring clip 34 which is secured to the under side of the rear end of the spoke 19 by screws 35; this clip may be made in various ways: As shown, its rear end 36 is received in a transverse slot in the spoke, and its forward end is split to form the gripping fingers 38 between which the cross bar 10 is received (Fig. 4). In order to allow the wheel to be assembled on the hub without detaching the rim from the spider, the aprons 23 are made to terminate a sufficient distance from the rim to allow the hub to be readily entered in or detached from the grooves 24 when the retaining clip 34 is removed.

Thus it will be seen that the guides 9 and grooves in the spoke 19 are subjected to very little wear, since they are used practically only to direct the wheel from one position to another, it being understood that substantially the entire steering impulse is transmitted through the pin 26. The use of adjusting means for taking up the wear in the grooves and guides is, therefore, unnecessary, and at the same time the parts may be fitted loosely to allow free sliding movement without causing shakiness when in steering relation.

In the modification shown in Figs. 5 to 8, inclusive, the head 40 is loosely mounted on the steering rod 41, and is rigidly secured to the latter, when in steering position, by means of the tapered end 42 with which the torque pin 43, which corresponds to the pin 26, is provided, said end being received in a slot 44 formed in the split upper end 45 of the steering rod (Fig. 6). Therefore, when the wheel is in any position other than the steering position it is impossible to turn the steering rod. Looseness of the head in respect to the rod is taken up by the circumferential expansion of the rod as the end 42 approaches its ultimate position; the body 46 of the pin 43 is preferably cylindrical instead of tapered.

The latch heretofore described is replaced by certain mechanism the details of which will now be pointed out: The cross bar 50 is chambered to receive the cylindrical latch bolt 51 having an eccentric end 52, and has a slot that comprises an inner longitudinal portion 53 which merges into an outer spiral portion 54. A finger grip 55, rigid with the bolt, projects through the slot; and a spring 56 tends to thrust the bolt outwardly. It is apparent, therefore, that when the bolt comes into alinement with a socket 58 formed in the wall of the spoke 19 (which takes place when the pin 43 is almost fully in the socket in the head), its eccentric end will be thrust therein, after which the bolt may be turned by means of the finger grip to draw the wheel rearwardly until the wheel, the head and the steering rod are tightly clamped together.

It will be noticed that the cross bar 50 is pierced longitudinally at 60 and that the bolt 51—52 is likewise pierced at 61, the passage therein opening outwardly at 62 in the plane of the groove 24; also that the cross bar is provided with an inwardly opening valve 63, the ball 64 of which is held against its seat by a spring 65. This construction affords a very convenient means for lubricating the grooves 24 as a very small amount of the heavy lubricant with which the chamber for the spring 56 is filled is forced out into the grooves at each reciprocation of the latch bolt.

In order to prevent the wheel from being returned to steering position by unauthorized persons, the spoke 19 is provided near its rear end with a socket 68, similar to socket 58, into which the latch bolt snaps when the wheel has reached the limit of its forward movement, and a lock 69 of suitable character is housed in the end of the spoke 19, said lock having a bolt 70 arranged to be thrust out behind the finger grip when the bolt is seated in the socket 68.

Another form of latch mechanism is illustrated in Figs. 4ª and 4ᵇ. In this instance, one of the divisions of the spoke is provided with a boss 80 in which a hollow plug 81 is threaded; passing through this plug is a plunger 82 having a tapered head 83 that wedges against the end of one of the guides 9, whereby the wheel is drawn into close engagement with the head when the parts are in steering position. In this instance the guiding surfaces are preferably lubricated by oilers 84 located on the respective spoke divisions.

If desired (Figs. 5 and 7) the sections of the spoke 19 may be grooved on their under surfaces and steel clips 73, provided with upturned ends 74 and secured to the head 8 or 40, as the case may be, by screws 75, may be arranged to coöperate therewith to prevent spreading, and for purposes of adjustment, it being understood that the hole in the clips 73 is somewhat larger than the diameter of the screws. The opposite ends 76 may also be turned up and received in grooves in the head. Or (Figs. 4ᶜ and 4ᵈ) the spider may be formed of stamped or pressed metal, in which case the divisions of the spoke preferably comprise the aprons 90 arranged in vertical planes, and substantially U shaped portions into which the aprons merge at their upper edge, the upper flanges 92 of the U shaped portions being preferably in a plane at right angles to the aprons and terminating in downturned edge flanges 93 which are received in grooves cut in the upper faces of the guides 94. It will be noticed that the aprons lie inwardly from the outer limits of the U-shaped portions and that the lower flanges 95 of the U shaped portions embrace the guides to prevent the spider from tipping upwardly. The flanges 93 obviously prevent spreading of the division of the spoke. A cup shaped stamping 96 may be welded to one of the spoke divisions and serve as a housing for the locking plunger 98 and spring 99, the functions of which are obvious. Various other modifications may also obviously be made without departing from the spirit of my invention; I do not, therefore, wish to be limited otherwise than as indicated by the subjoined claims.

I claim:—

1. In combination, a steering rod for motor vehicles, a head for the rod, a steering wheel slidable bodily on the head from steering to non-steering position, said head and said wheel having coöperating guiding surfaces, means for retaining said wheel in steering position, means for transmitting turning force from said wheel to said rod independently of said guiding surfaces when the wheel is in steering position, said means including a projection on one of the members and a socket on another, and wheel retaining means, comprising an eccentric latch member whereby the projection is brought into close engagement with the socket and the wheel is retained in steering position.

2. In combination, a steering rod for motor vehicles, a head for the rod, a steering wheel slidable bodily on the head from steering to non-steering position, said head and said wheel having coöperating guiding surfaces, means for retaining said wheel in steering position, and means whereby lubricant is supplied to said guiding surfaces through the action of said wheel retaining means.

3. In combination, a steering rod for motor vehicles, a head for the rod, a steering wheel for the head, coöperating guiding means on the wheel and head whereby the wheel is allowed bodily movement crosswise of the rod from steering to non-steering position, retaining means for holding the wheel in steering position, and a lock for holding the steering wheel in non-steering position.

4. In combination, a steering rod for motor vehicles, a head for the rod, a steering wheel for the head, coöperating guiding means on the wheel and head whereby the wheel is allowed bodily movement crosswise of the rod from steering to non-steering position, retaining means for holding the wheel in steering position, and a lock for holding the steering wheel in non-steering position, said lock being carried by the wheel.

5. In combination, a steering rod for motor vehicles, a head loose on the rod, a steering wheel for the head, coöperating guiding means on the wheel and head whereby the wheel is allowed bodily movement crosswise of the rod from steering to non-steering position, said head and wheel being free to turn on the rod when the wheel is in non-steering position, and means whereby the parts are coupled together against relative rotary movement when the wheel is in steering position, said last named means being dependent for its operation upon a bodily movement of the wheel to steering position.

6. In combination, a steering rod for motor vehicles, a head loose on the rod, a steering wheel for the head, coöperating guiding means on the wheel and head whereby the wheel is allowed bodily movement crosswise of the rod from steering to non-steering position, said head and wheel being free to turn on the rod when the wheel is in non-steering position, means whereby the parts are coupled together against relative rotary movement when the wheel is in steering position, said last named means being operable to couple the head to the rod only when the wheel is in steering position, and a lock for holding the steering wheel in non-steering position.

7. In combination, a steering rod for motor vehicles, a head loose on the rod, a steering wheel for the head, said wheel being movable in respect to the head from steering to non-steering position, said head being free to turn on the rod when the wheel is in non-steering position and being coupled thereto against relative rotary movement when the wheel is in steering position, said last named means being operable to couple the head to the rod only when the wheel is in steering position, and a lock for holding the wheel in non-steering position.

8. In combination, a steering rod for motor vehicles, a head loose on the rod, a steering wheel for the head, said wheel being movable in respect to the head from steering to non-steering position, said head being free to turn on the rod when the wheel is in non-steering position, said head having an opening, one of the other members having a socket and the third member having a projection which is received in the opening and socket when the wheel is in steering position, whereby the wheel, the head and the rod are coupled together against relative rotary movement, and a lock for holding the wheel in non-steering position.

9. In combination, a steering rod for motor vehicles, a head loose on the rod, a steering wheel for the head, said wheel being slidable cross-wise in respect to the head from steering to non-steering position, said head being free to turn on the rod when the wheel is in non-steering position, said head having an opening, one of the other members having a socket and the third member having a projection which is received in the opening and socket when the wheel is in steering position, whereby the wheel, the head and the rod are coupled together against relative rotary movement, and a lock for holding the wheel in non-steering position.

10. In combination, a steering rod for motor vehicles, a head thereon, a steering wheel including a rim and spider slidable crosswise on the head, said spider having a divided spoke the divisions of which are parallel to each other and embrace the head, said head and divisions having coöperating guiding surfaces, the guiding surfaces on the spoke terminating a sufficient distance from the rim to allow the head and wheel to be assembled or detached in respect to one another without removing the rim from the spider.

11. In combination, a steering rod for motor vehicles, a head for the rod, a steering wheel slidable bodily on the head from steering to non-steering position, said head and said wheel having coöperating guiding surfaces, means for retaining said wheel in steering position, and wheel retaining means, comprising an eccentric latch member whereby the wheel and head are brought into close engagement with each other when the wheel is in steering position.

12. In combination, a steering rod for motor vehicles, a head for the rod, a steering wheel slidable bodily on the head from steering to non-steering position, said head and said wheel having coöperating guiding surfaces, means for retaining said wheel in steering position, said wheel retaining means, comprising an eccentric latch bolt which is slidable longitudinally along its own axis whereby the wheel and head are brought into close engagement with each other when the wheel is in steering position.

13. In combination, a steering rod for motor vehicles, a head thereon, a steering wheel including a rim and spider slidable crosswise on the head, said spider having a divided spoke the divisions of which are parallel to each other and embrace the head, means for tying the divisions to each other through the head, said head and divisions having coöperating guiding surfaces.

14. In combination, a steering rod for motor vehicles, a head loose on the rod, a steering wheel for the head, said wheel being slidable crosswise in respect to the head from steering to non-steering position, said head being free to turn on the rod when the wheel is in non-steering position, said head having an opening, the rod being slotted, said wheel having a tapered projection which passes through the opening and engages the walls of the slot when the wheel is in steering position, whereby the rod is expanded to tightly engage the head and whereby the rod, the head and the wheel are coupled together against relative rotary movement.

15. In combination, a steering rod, a head therefor, a steering wheel slidable on the head, said wheel including parallel depending aprons, said aprons and said head having coöperating guiding surfaces, and means for retaining the guiding surfaces in adjusted relation to one another, said means being located entirely between the outer surfaces of the aprons and below the upper surfaces thereof whereby it is concealed.

16. In combination, a steering rod for motor vehicles, a head for the rod, a steering wheel slidable bodily on the head from steering to non-steering position, said head having grooves in its upper surface, and said wheel including a spider having spaced portions, said spaced portions having downwardly extending flanges received in the grooves, whereby the wheel is guided in its sliding movement and whereby the spaced portions are prevented from spreading.

17. In combination, a steering rod for motor vehicles, a head for the rod, a steering wheel slidable bodily on the head from steering to non-steering position, said head having grooves in its upper surface, and said wheel including a sheet metal spider having spaced portions, said spaced portions having downwardly extending edge flanges received in the grooves whereby the wheel is guided in its sliding movement and whereby the spaced portions are prevented from spreading.

18. In combination, a steering rod for motor vehicles, a head for the rod, a steering wheel slidable bodily on the head from steering to non-steering position, said head having grooves in its upper surface, and said wheel including a spider having spaced portions, said spaced portions having downwardly extending flanges received in the grooves, whereby the wheel is guided in its sliding movement and whereby the spaced portions are prevented from spreading, said spaced portions having inwardly opening grooves into which the head is received whereby the spider is prevented from tilting on the head.

PATRICK L. HUSSEY.